US009665469B2

(12) United States Patent
Christopher et al.

(10) Patent No.: US 9,665,469 B2
(45) Date of Patent: May 30, 2017

(54) SYSTEM AND METHOD OF RUNTIME DOWNLOADING OF DEBUG CODE AND DIAGNOSTICS TOOLS IN AN ALREADY DEPLOYED BASEBOARD MANAGEMENT CONTROLLER (BMC) DEVICES

(71) Applicant: American Megatrends, Inc., Norcross, GA (US)

(72) Inventors: Samvinesh Christopher, Suwanee, GA (US); Anurag Bhatia, Lilburn, GA (US); Winston Thangapandian, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 2 days.

(21) Appl. No.: 14/808,701

(22) Filed: Jul. 24, 2015

(65) Prior Publication Data

US 2017/0024303 A1 Jan. 26, 2017

(51) Int. Cl.
*G06F 9/44* (2006.01)
*G06F 11/36* (2006.01)

(52) U.S. Cl.
CPC ................. *G06F 11/366* (2013.01)

(58) Field of Classification Search
CPC .................. G06F 11/336; G06F 17/30194
USPC ........................................ 717/127
See application file for complete search history.

(56) References Cited

U.S. PATENT DOCUMENTS

| | | | | |
|---|---|---|---|---|
| 6,219,828 B1* | 4/2001 | Lee | ...................... | G06F 9/4401 711/102 |
| 6,832,345 B2* | 12/2004 | Corteville | ........ | G01R 31/31705 714/25 |
| 7,013,469 B2* | 3/2006 | Smith | ..................... | G06F 9/465 719/315 |
| 7,634,760 B1* | 12/2009 | Gumtow | ............. | G06F 11/3664 714/38.14 |
| 7,861,119 B1* | 12/2010 | Righi | .................... | G06F 11/366 714/25 |
| 8,495,626 B1* | 7/2013 | Hanes | ....................... | G06F 8/60 717/178 |
| 8,510,543 B1* | 8/2013 | Shankar | .................. | G06F 9/441 710/10 |

(Continued)

*Primary Examiner* — Lewis A Bullock, Jr.
*Assistant Examiner* — Theodore Hebert
(74) *Attorney, Agent, or Firm* — Locke Lord LLP; Tim Tingkang Xia, Esq.

(57) ABSTRACT

A system includes a baseboard management controller (BMC) and a remote computing device communicatively connected to the BMC via a network. The BMC includes a processor, a volatile memory, and a non-volatile memory storing a firmware. The remote computing device includes first and second computer executable code. The firmware, when executed at the processor, is configured to: in response to a debug command, request, receive, and execute the first computer executable code. The first computer executable code, when executed at the processor, is configured to mount a remote file system to the BMC corresponding to the second computer executable code, such that the second computer executable code is accessible to the BMC, retrieve the second computer executable code, and execute the second computer executable code at the BMC to perform an on-site debug process without interrupting operation of the firmware.

20 Claims, 2 Drawing Sheets

(56) References Cited

U.S. PATENT DOCUMENTS

| | | | | |
|---|---|---|---|---|
| 8,793,680 B2* | 7/2014 | Jeong | H04W 24/02 | 717/170 |
| 2003/0120970 A1* | 6/2003 | Chen | G06F 11/261 | 714/25 |
| 2005/0071624 A1* | 3/2005 | Rothman | G06F 9/4406 | 713/100 |
| 2005/0193189 A1* | 9/2005 | Kim | G06F 9/4416 | 713/1 |
| 2007/0010983 A1* | 1/2007 | Bauer | G06Q 10/109 | 703/17 |
| 2008/0178143 A1* | 7/2008 | Dougan | G06F 8/20 | 717/100 |
| 2008/0295077 A1* | 11/2008 | Sengupta | G06F 11/0748 | 717/124 |
| 2010/0175062 A1* | 7/2010 | Kim | G06F 8/65 | 717/173 |
| 2010/0245367 A1* | 9/2010 | Weng | G06F 8/65 | 345/520 |
| 2011/0119662 A1* | 5/2011 | Chen | G06F 8/65 | 717/168 |
| 2011/0161736 A1* | 6/2011 | Orita | G06F 11/0793 | 714/34 |
| 2013/0139128 A1* | 5/2013 | Jones | G06F 11/3664 | 717/128 |
| 2013/0185402 A1* | 7/2013 | Ayanam | H04L 41/0813 | 709/221 |
| 2014/0068342 A1* | 3/2014 | Chuang | G06F 11/362 | 714/38.14 |
| 2014/0149731 A1* | 5/2014 | Reick | G06F 9/4436 | 713/2 |
| 2014/0317612 A1* | 10/2014 | Ayanam | G06F 8/665 | 717/171 |
| 2015/0052596 A1* | 2/2015 | Ayanam | G06F 21/572 | 726/8 |
| 2015/0242293 A1* | 8/2015 | Segger | G06F 11/26 | 714/33 |
| 2016/0154820 A1* | 6/2016 | Singh | H04L 67/1097 | 707/827 |

\* cited by examiner

SYSTEM AND METHOD OF RUNTIME DOWNLOADING OF DEBUG CODE AND DIAGNOSTICS TOOLS IN AN ALREADY DEPLOYED BASEBOARD MANAGEMENT CONTROLLER (BMC) DEVICES

FIELD

The present disclosure relates generally to baseboard management controller (BMC) technology, and more particularly to systems and methods of online BMC firmware debugging without changing the existing firmware image and the environment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In typical world, creating error-free software is not possible. So products are shipped and periodic updates and fixes are provided when issues are reported. To reproduce and track the issues, it is often required to recreate the exact situation where the error happened. This is easy in case of normal application software which is not affected by many environmental factors. However, in embedded world, firmware has many time critical code, and interacts with many components of a system and different environmental condition on the deployed locations. The error is not easily reproducible in another setup or location. Further, in most cases altering the code for debugging the issue often hides the errors.

Therefore, an unaddressed need exists in the art to address the aforementioned deficiencies and inadequacies.

SUMMARY

In one aspect, the disclosure is directed to a system including a baseboard management controller (BMC) and at least one remote computing device communicatively connected to the BMC via a network. In certain embodiments, the BMC includes a processor, a volatile memory, and a non-volatile memory storing a firmware. The at least one remote computing device includes first computer executable code and second computer executable code. The firmware, when executed at the processor of the BMC, is configured to:

in response to a debug command, request the first computer executable code from the at least one remote computing device via the network, and receive the first computer executable code; and execute the first computer executable code received by the BMC.

The first computer executable code, when received by the BMC and executed at the processor of the BMC, is configured to:

mount a remote file system to the BMC corresponding to the second computer executable code of the at least one remote computing device, such that the second computer executable code is accessible to the BMC;

retrieve the second computer executable code from the remote file system; and execute the second computer executable code at the BMC to perform an on-site debug process without interrupting operation of the firmware in the BMC.

In certain embodiments, the remote file system is a network file system (NFS) or a common internet file system (CIFS).

In certain embodiments, the first computer executable code includes a remote debug application, and the second computer executable code includes a debug and diagnostic module and a fixing module.

In certain embodiments, the at least one remote computing device includes a first remote computing device and a second remote computing device respectively communicatively connected to the BMC, where the first remote computing device stores the remote debug application, and the second remote computing device stores the debug and diagnostic module and the fixing module.

In certain embodiments, the remote debug application, when received by the BMC and executed at the processor of the BMC, is configured to execute the second computer executable code at the BMC by:

loading the debug and diagnostic module from the mounted remote file system to the volatile memory of the BMC; and executing the debug and diagnostic module in the volatile memory to perform the on-site debug process.

In certain embodiments, the debug and diagnostic module, when executed at the processor of the BMC, is configured to:

in response to detecting a bug during the on-site debug process, load the fixing module from the mounted remote file system to the volatile memory of the BMC; and execute the fixing module in the volatile memory of the BMC to fix the detected bug.

In certain embodiments, the fixing module, when executed at the processor of the BMC, is configured to:

generate a fixed code to fix the detected bug.

In certain embodiments, the firmware further comprises an update module, wherein the update module, when executed at the processor of the BMC, is configured to:

update the firmware stored in the non-volatile memory of the BMC based on the fixed code generated by the fixing module.

In another aspect, the disclosure is directed to a method of debugging a BMC. In certain embodiments, the method includes:

in response to receiving a debug command, requesting, by the BMC, first computer executable code from at least one remote computing device via a network, and receiving the first computer executable code, wherein the at least one remote computing device is communicatively connected to the BMC via the network;

executing, at a processor of the BMC, the first computer executable code received by the BMC;

mounting, by the processor of the BMC executing the first computer executable code, a remote file system to the BMC corresponding to second computer executable code of the at least one remote computing device, such that the second computer executable code is accessible to the BMC;

retrieving, by the processor of the BMC executing the first computer executable code, the second computer executable code from the remote file system; and executing, by the processor of the BMC executing the first computer executable code, the second computer executable code at the BMC to perform an on-site debug process without interrupting operation of firmware in the BMC.

In certain embodiments, the remote file system is a network file system (NFS) or a common internet file system (CIFS).

In certain embodiments, the first computer executable code includes a remote debug application, and the second computer executable code includes a debug and diagnostic module and a fixing module.

In certain embodiments, the at least one remote computing device includes a first remote computing device and a second remote computing device respectively communicatively connected to the BMC, where the first remote computing device stores the remote debug application, and the second remote computing device stores the debug and diagnostic module and the fixing module.

In certain embodiments, the remote debug application, when received by the BMC and executed at the processor of the BMC, is configured to execute the second computer executable code at the BMC by:

loading the debug and diagnostic module from the mounted remote file system to the volatile memory of the BMC; and executing the debug and diagnostic module in the volatile memory to perform the on-site debug process.

In certain embodiments, the debug and diagnostic module, when executed at the processor of the BMC, is configured to: in response to detecting a bug during the on-site debug process, load the fixing module from the mounted remote file system to the volatile memory of the BMC; and execute the fixing module in the volatile memory of the BMC to fix the detected bug.

In certain embodiments, the fixing module, when executed at the processor of the BMC, is configured to: generate a fixed code to fix the detected bug.

In a further aspect, the disclosure is directed to at least one non-transitory computer readable medium storing first, second and third computer executable code executable at a processor of a BMC. In certain embodiments, the third computer executable code, when executed at the processor of the BMC, is configured to: in response to receiving a debug command, request the first computer executable code from at least one remote computing device via a network, and receiving the first computer executable code, wherein the at least one remote computing device is communicatively connected to the BMC via the network; and execute the first computer executable code received by the BMC. The first computer executable code, when executed at the processor of the BMC, is configured to: mount a remote file system to the BMC corresponding to second computer executable code of the at least one remote computing device, such that the second computer executable code is accessible to the BMC; retrieve the second computer executable code from the remote file system; and execute the second computer executable code at the BMC to perform an on-site debug process without interrupting operation of the BMC.

In certain embodiments, the remote file system is a network file system (NFS) or a common internet file system (CIFS).

In certain embodiments, the first computer executable code includes a remote debug application, and the second computer executable code includes a debug and diagnostic module and a fixing module.

In certain embodiments, the at least one remote computing device comprises a first remote computing device and a second remote computing device respectively communicatively connected to the BMC, where the first remote computing device stores the remote debug application, and the second remote computing device stores the debug and diagnostic module and the fixing module.

In certain embodiments, the remote debug application, when received by the BMC and executed at the processor of the BMC, is configured to execute the second computer executable code at the BMC by:

loading the debug and diagnostic module from the mounted remote file system to the volatile memory of the BMC; and executing the debug and diagnostic module in the volatile memory to perform the on-site debug process.

In certain embodiments, the debug and diagnostic module, when executed at the processor of the BMC, is configured to: in response to detecting a bug during the on-site debug process, load the fixing module from the mounted remote file system to the volatile memory of the BMC; and execute the fixing module in the volatile memory of the BMC to fix the detected bug.

In certain embodiments, the fixing module, when executed at the processor of the BMC, is configured to: generate a fixed code to fix the detected bug.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
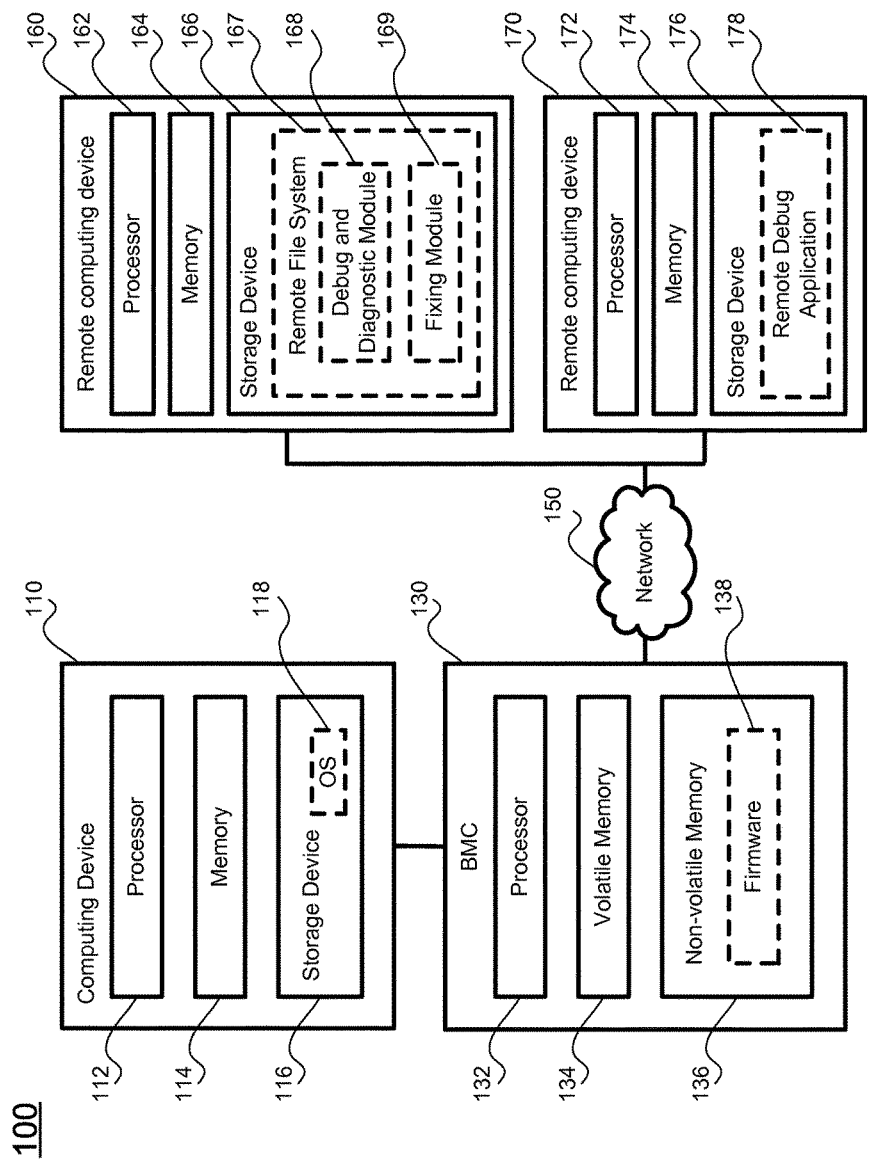
FIG. 1 schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term "network file system" or its abbreviation "NFS," as used herein, generally refers to a distributed file system protocol originally developed by Sun Microsystems in 1984. NFS is a client/server application that lets a computer user view and optionally store and update file on a remote computer as though they were on the user's own computer. The user's system needs to have an NFS client and the other computer needs the NFS server. Both of them require that you also have TCP/IP installed since the NFS server and client use TCP/IP as the program that sends the files and updates back and forth. NFS is made possible by a mixture of kernel functionality on the client side (that uses the remote file system) and an NFS server on the server side (that provides the file data). This file access is completely transparent to the client, and works across a variety of server and host architectures. NFS, like many other protocols, builds on the Open Network Computing Remote Procedure Call (ONC RPC) system.

The term "Common Internet File System" or its abbreviation "CIFS," as used herein, generally refers to a standard way that computer users share files across corporate intranets and the Internet. CIFS is a protocol that lets programs make requests for files and services on remote computers on the Internet. CIFS uses the client/server programming model. A client program makes a request of a server program (usually in another computer) for access to a file or to pass a message to a program that runs in the server computer. The server takes the requested action and returns a response. With CIFS, users with different platforms and computers can share files without having to install new software. An enhanced version of the Microsoft open, cross-platform Server Message Block (SMB) protocol, CIFS is a native file-sharing protocol in Windows 2000.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As discussed above, a BMC has a flash memory or other types of non-volatile memory to store its firmware and other necessary configuration data.

Since the firmware of the BMC has many time critical code, interacts with many components of the system and different environment condition on the deployed locations, it is not easy to reproduce an error or a bug in another setup or location. To reproduce the issue, it is needed to create a non-intrusive debugging in the specific location. In other words, extra tools and debug code need to be added to the system for debugging, without changing the existing firmware image and the environment.

Further, in an embedded firmware like the BMC, the image is flashed in a persistent storage like SPI flash or EEPROM. Modifying a part of image is not possible as it requires re-flashing the entire device which alters the real scenario which created the error. So in such storage devices it is not possible to download the debug tools to the image.

Therefore, in one aspect, the present disclosure is directed to a system that is capable of performing debugging for a deployed BMC with non-intrusive debugging. In certain embodiments, the deployed BMC should have support for a remote debug console and ability to mount remote file systems like NFS, CIFS. . . . During debugging, all the debug and diagnostic code are loaded from the remote file system. Through the remote debug console/application, mount the remote file system on the image. This does not affect the deployed BMC image and will continue to execute as normal. So the issue will be reproduced as before. Now the debug and diagnostic code can be used to track the bug. Once the issue is fixed, the fixed code in the remote file system can be loaded, and executed it instead of the bug-code in the image. Once the fixed code was validated, a new image may be created with the fixed code and be deployed on all the systems which have the error BMC image.

FIG. 1 schematically depicts a system according to certain embodiments of the present disclosure. As shown in FIG. 1, the system 100 includes a computing device 110 having a BMC 130, and remote computing devices 160 and 170. The BMC 130 is connected to the computing device 110 via a system interface, or via one or more interfaces replacing or in addition to the system interface, such as a universal serial bus (USB) interface. The system 100 may be a system that incorporates more than one interconnected system, such as a client-server network. The network may be a wired or wireless network, and may be of various forms such as a local area network (LAN) or wide area network (WAN) including the Internet. In certain embodiments, the system 100 may include other physical or virtual components not shown in FIG. 1.

The computing device 110 is a host computer of the BMC 130. In certain embodiments, the computing device 110 may be a general purpose computer or a headless computer. Generally, the computing device 110 includes a baseboard or the "motherboard" (not shown). The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

The components on the baseboard of the computing device 110 may include, but not limited to, a processor 112, a memory 114, and other required memory and Input/Output (I/O) modules (not shown). In certain embodiments, the BMC 130 may also be a component on the baseboard. In certain embodiments, the processor 112 and the memory 114 may be embedded on the baseboard, or may be connected to the baseboard through at least one interface. In certain embodiments, the interface may be physical hardware interface such as electrical connectors, buses, ports, cables, terminals, or other I/O devices.

The computing device 110 may further include a storage device 116, which stores multiple software applications, including an operating system (OS). In certain embodiments, the storage device 116 may be connected to the baseboard of the computing device 110. In certain embodiments, the computing device 110 may include at least one I/O device (not shown) for generating and controlling input and output signals of the computing device 110. Examples of the I/O device include keyboards, touch pads, mouse, microphones, display screens, touch screens, or other I/O devices applicable for the computing device 110. Some I/O devices, such as touch screens, are provided for the dual input/output purposes.

The processor 112 is a host processor which is configured to control operation of the computing device 110. In certain embodiments, the processor 112 may be a central processing unit (CPU). The processor 112 may execute the OS or other applications of the computing device 110. In certain embodiments, the computing device 110 may run on or more than one processor, such as two processors, four processors, eight processors, or any suitable number of processors.

The memory 114 may be a volatile memory, such as the random-access memory (RAM), for storing the data and information during the operation of the computing device 110. In certain embodiments, the memory 114 is in communication with the processor 112 through a system bus (not shown).

The storage device 116 is a non-volatile data storage media for storing the OS 118 and other applications of the computing device 110. Examples of the storage device 116 may include flash memory, memory cards, USB drives, hard drives, floppy disks, optical drives, or any other types of data storage devices.

The BMC 130 is a specialized microcontroller that manages the interface between system management software and platform hardware. In certain embodiments, the BMC 130 may be a service processor (SP). Different types of sensors can be built into the computing device 110, and the BMC 130 reads these sensors to obtain parameters such as temperature, cooling fan speeds, power status, OS status, etc.

The BMC 130 monitors the sensors and can send out-of-band (OOB) alerts to a system administrator of the computing device 110 if any of the parameters do not stay within preset limits, indicating a potential failure of the computing device 110. In certain embodiments, the administrator can also remotely communicate with the BMC 130 from a remote management computer via a network to take remote action to the computing device 110. For example, the administrator may reset the computing device 110 from the remote management computer through the BMC 130, and may obtain system information of the computing device 110 OOB without interrupting the operation of the computing device 110.

As shown in FIG. 1, the BMC 130 includes a processor 132, a volatile memory 134 and a non-volatile memory 136. In certain embodiments, one or more remote computing devices 160 and/or 170 may be connected to the BMC 130 via a network 150. In certain embodiments, the BMC 130 may include other components, such as at least one I/O device (not shown).

The processor 132 controls operation of the BMC 130. The processor 132 may execute the firmware 138 or other codes stored in the BMC 130. In certain embodiments, the BMC 130 may run on or more than one processor.

The volatile memory 134 may be the RAM, which is configured to store the data and information during the operation of the BMC 130. When the BMC 130 restarts, the contents stored in the volatile memory 134 will be lost.

The non-volatile memory 136 can be a flash memory and is configured to store code and data required for the operation of the BMC 130, such as a firmware 138. In certain embodiments, the firmware 138 includes an NFS module or a CIFS module, such that a remote NFS or CIFS file system may be mounted to the BMC 130 and accessible to the BMC 130. The firmware 138, when executed at the processor 132 of the BMC 130, is configured to, in response to a debug command, request the remote debug application 178 of the remote computing device 170 via the network 150, receive the remote debug application 178, and execute the remote debug application 178 received by the BMC 130. In certain embodiments, the firmware 138 may include a monitoring module (not shown) for monitoring status of the computing device 110. In certain embodiments, the firmware 138 further includes an update module. The update module, when executed at the processor 132 of the BMC 130, is configured to update the firmware 138 stored in the non-volatile memory 136 of the BMC 130 based on the fixed code generated by the fixing module 169.

The system 100 may further include the remote computing device 160 communicatively connected to the BMC via the network 150. The remote computing device 160 may be a remote server providing services for debugging the BMC 130. In certain embodiments, the remote computing device 160 may be a general purpose computer or a headless computer. In certain embodiments, the components of the remote computing device 160 may include, but not limited to, a processor 162, a memory 164, a storage device 166, and other required memory and Input/Output (I/O) modules (not shown).

The processor 162 is configured to control operation of the remote computing device 160. In certain embodiments, the processor 162 may be a central processing unit (CPU). The processor 162 may execute an OS or other applications of the remote computing device 160. In certain embodiments, the remote computing device 160 may run on or more than one processor, such as two processors, four processors, eight processors, or any suitable number of processors.

The memory 164 may be a volatile memory, such as the random-access memory (RAM), for storing the data and information during the operation of the remote computing device 160. In certain embodiments, the memory 164 is in communication with the processor 162 through a system bus (not shown).

The storage device 166 is a non-volatile data storage media for storing the OS and other applications of the remote computing device 160. Examples of the storage device 166 may include flash memory, memory cards, USB drives, hard drives, floppy disks, optical drives, or any other types of data storage devices.

In certain embodiments, the storage device 166 includes a remote file system 167. In one embodiment, the remote file system 167 is a NFS or CIFS file system. As shown in FIG. 1, the remote file system 167 may include a debug and diagnostic module 168 and a fixing module 169. In certain embodiments, the debug and diagnostic module 168, when mounted to the BMC 130 and executed at the BMC 130, is configured to debug and diagnose errors of the BMC 130, or track the errors/bugs. Specifically, the debug and diagnostic module 168, when executed at the processor 132 of the BMC 130, is configured to, in response to detecting a bug during the on-site debug process, load the fixing module 169 from the mounted remote file system to the volatile memory 134, and execute the fixing module 169 in the volatile memory 134 of the BMC 130 to fix the detected bug. In certain embodiments, the fixing module 169 may include multiple fixing codes corresponding to different errors/bugs of the BMC 130. In certain embodiments, the fixing module 169, when mounted to the BMC 130 and executed at the processor 132 of the BMC 130, is configured to provide fixing code for repairing the BMC 130, so as to generate a fixed code to fix the detected bug. The fixed code, once executed at the BMC and validated to be free of error, may be used to replace the original code or firmware of the BMC 130 that results error.

The system 100 may further include a remote computing device 170 communicatively connected to the BMC via the network 150. The remote computing device 170 may be a remote server providing services for instructing the debug of the BMC 130. In certain embodiments, the remote computing device 170 may be a general purpose computer or a headless computer. In certain embodiments, the components of the remote computing device 170 may include, but not limited to, a processor 172, a memory 174, a storage device 176, and other required memory and Input/Output (I/O) modules (not shown).

The processor 172 is configured to control operation of the remote computing device 170. In certain embodiments, the processor 172 may be a central processing unit (CPU). The processor 172 may execute an OS or other applications of the remote computing device 170. In certain embodiments, the remote computing device 170 may run on or more than one processor, such as two processors, four processors, eight processors, or any suitable number of processors.

The memory 174 may be a volatile memory, such as the random-access memory (RAM), for storing the data and information during the operation of the remote computing device 170. In certain embodiments, the memory 174 is in communication with the processor 172 through a system bus (not shown).

The storage device 176 is a non-volatile data storage media for storing the OS and other applications of the remote computing device 170. Examples of the storage device 176 may include flash memory, memory cards, USB drives, hard drives, floppy disks, optical drives, or any other types of data storage devices.

In certain embodiments, the storage device 176 includes a remote debug application 178. In one embodiment, the remote debug application 178 is configured to interact with the BMC 130, such as send request to and receive responses from the BMC 130. The requests, which may be command, when being sent to the BMC 130 and executed at the BMC 130, may be executed at the process of the BMC 130. In certain embodiments, the whole remote debug application 178 is received at the BMC 130, and may be executed at the process of the BMC 130. The remote debug application 178, when executed at the processor 132 of the BMC 130, is configured to mount the remote file system 167 to the BMC 130, retrieve the debug and diagnostic module 168 from the mounted remote file system 167, and execute the debug and diagnostic module 168 at the BMC 130 to perform an on-site debug process without interrupting operation of the firmware 138 in the BMC 130. Specifically, the remote debug application 178 is configured to execute the debug and diagnostic module 168 by loading the debug and diagnostic module from the mounted remote file system to the volatile memory 134 of the BMC 130, and executing the debug and diagnostic module 168 in the volatile memory 134 to perform the on-site debug process. In certain embodiments, the remote debug application 178, when executed at the processor 132 of the BMC 130, is configured to retrieve both the debug and diagnostic module 168 and the fixing module 169, and executing the debug and diagnostic module 168 and the fixing module 169. In certain embodiments, the retrieving and executing of the fixing module 169 are instructed by the execution of the debug and diagnostic module 168.

Figure 2:
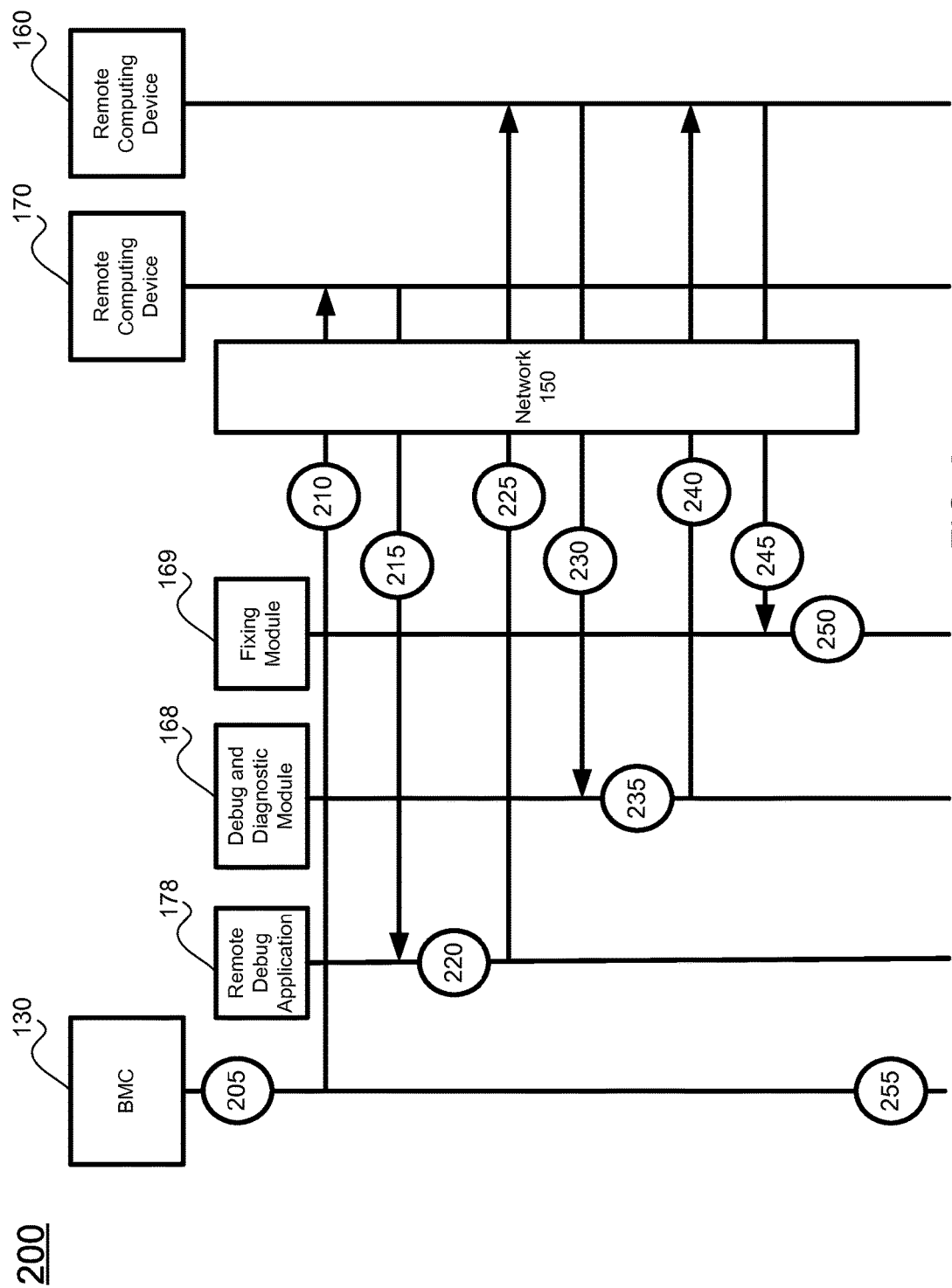
FIG. 2 schematically depicts a method of debugging a BMC according to certain embodiments of the present disclosure.

In certain embodiments, the system 100 may include only one of the remote computing devices 160 and 170, and the remote file system 167 and the remote debug application 178 are stored in the storage device of the one remote computing device, FIG. 2 schematically depicts a method of debugging of BMC devices of a system. The system may have the same structure as described above in FIG. 1.

The BMC 130 is configured to support the remote debug application 178 of the remote computing device 170.

In certain embodiments, when the BMC 130 has errors or bugs during running, at operation 205, the BMC 130 receives a debug command to start the debug process. The command may come from the computing device 110, or a remote device. The debug process may be an interactive process. In certain embodiments, the debug process includes operations 210-260, and the debug process may be executed at the volatile memory 134 of the BMC 130 by running the firmware 138.

At operation 210, in response to receiving the debug command to start the debug process, the firmware 138 executed at the processor 132 of the BMC 130 sends a request to the remote computing device 170 via the network 150, to request for the remote debug application 178.

At operation 215, in response to receiving the request, the remote computing device 170 sends the remote debug application 178 to the BMC 130 and the BMC 130 receives the remote debug application 178, or the BMC 130 retrieves the remote debug application 178 from the remote computing device 170. In certain embodiments, the remote debug application 178 may also be executed at the processor 172 of the remote computing device 170, and communicates with the processor 132 of the BMC 130 through a series requests/response between the processor 132 of the BMC 130 and the processor 172 of the remote computing device 170.

At operation 220, the remote debug application 178, when received at the BMC 130, is subsequently executed at the processor 132 of the BMC 130. Specifically, the remote debug application 178, when received and executed at the processor 132 of the BMC 130, is configured to mount the remote file system 167 of the remote computing device 160 to the BMC 130, such that the remote file system 167 is visible and operable by the BMC 130 the same as the local file system. The remote file system 167 includes the debug and diagnostic module 168 and the fixing module 169. Thus, the debug and diagnostic module 168 and the fixing module 169, after mounting of the remote system 167, are accessible to the BMC. The remote file system 167 may be a NFS or a CIFS file system that is supported by the deployed BMC 130.

As shown in FIG. 2, at operation 225, the debug application 178, when received and executed at the processor 132 of the BMC 130 is further configured to retrieve or load the debug and diagnostic module 168 and/or the fixing module 169 that are mounted to the BMC 130. Subsequently, at operation 230, the debug diagnostic module 168 is downloaded or retrieved from the mounted remote file system 167 to the BMC 130. The downloaded debug and diagnostic module 168 may be stored at the volatile memory 134.

At operation 235, the remote debug application 178, when executed at the processor 132, is further configured to execute the debug and diagnostic module 168 stored at the volatile memory 134 of the BMC, so as to perform an on-site debug process without interrupting operation of the firmware 138 in the BMC 130. That is, during the running of the debug and diagnostic module 168 at operation 235, the deployed BMC firmware 138 will continue to execute as normal without interruption. Therefore, the errors/bugs of the BMC 130 will be reproduced as before. The executed debug and diagnostic module 168 then can track the errors/bugs presented in the BMC 130 without interrupting the performance of the firmware 137.

In order to fix the tracked errors/bugs, at operation 240, the debug and diagnostic module 168 is configured to, in response to detecting a bug during the on-site debug process, load the fixing module 169 mounted to the BMC 130 to the volatile memory of the BMC 130. The fixing module 169 may include fixing codes configured to fix corresponding errors/bugs tacked by the executed debug and diagnostic module 168. Subsequently, at operation 245, the fixing module 169 or its fixing codes are downloaded from the mounted remote file system 167 to the BMC 130.

At operation 250, the debug diagnostic module 168 is further configured to execute the fixing module 169 stored in the volatile memory 134 at the processor 132, so as to fix the detected code. In certain embodiments, the fixing codes of the fixing module 169 are used to replace the corresponding problematic codes present in the volatile memory 134, so as to generate a fixed code to fix the detected bug. At this time, the BMC 130 may run using the fixed code at the volatile memory 134, such that the errors/bugs are fixed. In certain embodiments, the fixed code may corresponding to part of the firmware 138 that has bug. In certain embodiments, the fixed code is a complete code package that corresponding to the complete firmware 138.

In certain embodiments, the fixed code is generated based on the tracked errors/bug and the received fixing codes. In one embodiment, the fixing code is generated by the executed fixing module 169. In one embodiment, the fixing code may be generated by an administrator through analyzing the errors/bug information tracked by the debug and diagnostic module 168.

In certain embodiments, the operation 250 may further include validating the fixed code by running the fixed code, and tracking the status of the executed fixed code.

In certain embodiments, the method may further include an operation 255, where the fixed code at the volatile memory 134 is used to update the firmware 137 of the BMC 130. The operation 255 may be performed by the update module of the firmware 138 at the processor 132.

In certain embodiments, the operation 255 may include create a new firmware image using the fixed code, or/and flashing the firmware 137 using the fixed code.

In a further aspect, the present disclosure is related to at least one non-transitory computer readable medium storing computer executable code. The code, when executed at one or more processers 132 of the BMC 130, may perform the method as described above. In certain embodiments, the at least one non-transitory computer readable medium may include, but not limited to, any physical or virtual storage media. In certain embodiments, the at least one non-transitory computer readable medium may be implemented as at least one of the non-volatile memory 136 of the BMC 130, the storage device 166 of the remote computing device 160, and the storage device 176 of the remote computing device 170 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a baseboard management controller (BMC), comprising a processor, a volatile memory, and a non-volatile memory storing a firmware; and
at least one remote computing device communicatively connected to the BMC via a network, the at least one remote computing device comprising first computer executable code and second computer executable code;
wherein the firmware, when executed at the processor of the BMC, is configured to:
in response to a debug command, request the first computer executable code from the at least one remote computing device via the network, and receive the first computer executable code; and
execute the first computer executable code received by the BMC;
wherein the first computer executable code, when received by the BMC and executed at the processor of the BMC, is configured to:
mount a remote file system to the BMC corresponding to the second computer executable code of the at least one remote computing device, such that the second computer executable code is accessible to the BMC;
retrieve the second computer executable code from the remote file system;
execute the second computer executable code at the BMC to perform an on-site debug process without interrupting operation of the firmware in the BMC, and to generate a fixed code that is free of bug; and
run the fixed code at the BMC without rebooting the BMC.

2. The system of claim 1, wherein the remote file system is a network file system (NFS) or a common internet file system (CIFS).

3. The system of claim 1, wherein the first computer executable code comprises a remote debug application, and the second computer executable code comprises a debug and diagnostic module and a fixing module.

4. The system of claim 3, wherein the at least one remote computing device comprises a first remote computing device and a second remote computing device respectively communicatively connected to the BMC, wherein the first remote computing device stores the remote debug application, and the second remote computing device stores the debug and diagnostic module and the fixing module.

5. The system of claim 4, wherein the remote debug application, when received by the BMC and executed at the processor of the BMC, is configured to execute the second computer executable code at the BMC by:

loading the debug and diagnostic module from the mounted remote file system to the volatile memory of the BMC; and
executing the debug and diagnostic module in the volatile memory to perform the on-site debug process.

6. The system of claim 5, wherein the debug and diagnostic module, when executed at the processor of the BMC, is configured to:
in response to detecting a bug during the on-site debug process, load the fixing module from the mounted remote file system to the volatile memory of the BMC; and
execute the fixing module in the volatile memory of the BMC to fix the detected bug.

7. The system of claim 6, wherein the fixing module, when executed at the processor of the BMC, is configured to:
generate the fixed code to fix the detected bug.

8. The system of claim 7, wherein the firmware further comprises an update module, wherein the update module, when executed at the processor of the BMC, is configured to:
update the firmware stored in the non-volatile memory of the BMC based on the fixed code generated by the fixing module.

9. A method of debugging a baseboard management controller (BMC), comprising:
in response to receiving a debug command, requesting, by a processor of the BMC, first computer executable code from at least one remote computing device via a network, and receiving the first computer executable code, wherein the at least one remote computing device is communicatively connected to the BMC via the network;
executing, at a processor of the BMC, the first computer executable code received by the BMC;
mounting, by the processor of the BMC executing the first computer executable code, a remote file system to the BMC corresponding to second computer executable code of the at least one remote computing device, such that the second computer executable code is accessible to the BMC;
retrieving, by the processor of the BMC executing the first computer executable code, the second computer executable code from the remote file system;
executing, by the processor of the BMC executing the first computer executable code, the second computer executable code at the BMC to perform an on-site debug process without interrupting operation of firmware in the BMC, and to generate a fixed code that is free of bug; and
running the fixed code at the BMC without rebooting the BMC.

10. The method of claim 9, wherein the remote file system is a network file system (NFS) or a common internet file system (CIFS).

11. The method of claim 9, wherein the first computer executable code comprises a remote debug application, and the second computer executable code comprises a debug and diagnostic module and a fixing module.

12. The method of claim 11, wherein the at least one remote computing device comprises a first remote computing device and a second remote computing device respectively communicatively connected to the BMC, wherein the first remote computing device stores the remote debug application, and the second remote computing device stores the debug and diagnostic module and the fixing module.

13. The method of claim 12, wherein the remote debug application, when received by the BMC and executed at the processor of the BMC, is configured to execute the second computer executable code at the BMC by:
- loading the debug and diagnostic module from the mounted remote file system to the volatile memory of the BMC; and
- executing the debug and diagnostic module in the volatile memory to perform the on-site debug process.

14. The method of claim 13, wherein
the debug and diagnostic module, when executed at the processor of the BMC, is configured to:
- in response to detecting a bug during the on-site debug process, load the fixing module from the mounted remote file system to the volatile memory of the BMC; and
- execute the fixing module in the volatile memory of the BMC to fix the detected bug; and the fixing module, when executed at the processor of the BMC, is configured to:
- generate the fixed code to fix the detected bug.

15. At least one non-transitory computer readable medium storing first, second and third computer executable code executable at a processor of a baseboard management controller (BMC),
wherein the third computer executable code, when executed at the processor of the BMC, is configured to:
- in response to receiving a debug command, request the first computer executable code from at least one remote computing device via a network, and receiving the first computer executable code, wherein the at least one remote computing device is communicatively connected to the BMC via the network; and
- execute the first computer executable code received by the BMC;

wherein the first computer executable code, when executed at the processor of the BMC, is configured to:
- mount a remote file system to the BMC corresponding to second computer executable code of the at least one remote computing device, such that the second computer executable code is accessible to the BMC;
- retrieve the second computer executable code from the remote file system;
- execute the second computer executable code at the BMC to perform an on-site debug process without interrupting operation of the BMC, and to generate a fixed code that is free of bug; and
- run the fixed code at the BMC without rebooting the BMC.

16. The at least one non-transitory computer readable medium of claim 15, wherein the remote file system is a network file system (NFS) or a common internet file system (CIFS).

17. The at least one non-transitory computer readable medium of claim 15, wherein the first computer executable code comprises a remote debug application, and the second computer executable code comprises a debug and diagnostic module and a fixing module.

18. The at least one non-transitory computer readable medium of claim 17, wherein the at least one remote computing device comprises a first remote computing device and a second remote computing device respectively communicatively connected to the BMC, wherein the first remote computing device stores the remote debug application, and the second remote computing device stores the debug and diagnostic module and the fixing module.

19. The at least one non-transitory computer readable medium of claim 18, wherein the remote debug application, when received by the BMC and executed at the processor of the BMC, is configured to execute the second computer executable code at the BMC by:
- loading the debug and diagnostic module from the mounted remote file system to the volatile memory of the BMC; and
- executing the debug and diagnostic module in the volatile memory to perform the on-site debug process.

20. The at least one non-transitory computer readable medium of claim 13, wherein
the debug and diagnostic module, when executed at the processor of the BMC, is configured to:
- in response to detecting a bug during the on-site debug process, load the fixing module from the mounted remote file system to the volatile memory of the BMC; and
- execute the fixing module in the volatile memory of the BMC to fix the detected bug; and the fixing module, when executed at the processor of the BMC, is configured to:
- generate the fixed code to fix the detected bug.

* * * * *